United States Patent
Morimoto

(10) Patent No.: US 8,526,804 B2
(45) Date of Patent: Sep. 3, 2013

(54) IMAGE PICKUP APPARATUS AND METHOD OF CONTROLLING THE SAME

(75) Inventor: Yosuke Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 13/012,245

(22) Filed: Jan. 24, 2011

(65) Prior Publication Data

US 2011/0243538 A1 Oct. 6, 2011

(30) Foreign Application Priority Data

Apr. 6, 2010 (JP) ................................ 2010-087509

(51) Int. Cl.
*G03B 17/00* (2006.01)

(52) U.S. Cl.
USPC .............................................. 396/77; 396/85

(58) Field of Classification Search
USPC ...................................................... 396/77, 85
See application file for complete search history.

(56) References Cited

U.S. PATENT DOCUMENTS

| 5,260,732 | A * | 11/1993 | Goto et al. ....................... 396/60 |
| 2007/0025722 | A1* | 2/2007 | Matsugu et al. .............. 396/263 |
| 2007/0291104 | A1* | 12/2007 | Petersen et al. ............. 348/14.01 |
| 2008/0136958 | A1* | 6/2008 | Nakahara ........................ 348/345 |
| 2009/0185056 | A1* | 7/2009 | Okamoto et al. ......... 348/240.99 |
| 2011/0134284 | A1* | 6/2011 | Kuriyama .................. 348/240.3 |
| 2011/0149120 | A1* | 6/2011 | Kubota ..................... 348/240.99 |

FOREIGN PATENT DOCUMENTS

JP 9-149311 A 6/1997

* cited by examiner

*Primary Examiner* — W. B. Perkey
*Assistant Examiner* — Linda B Smith
(74) *Attorney, Agent, or Firm* — Canon USA Inc IP Division

(57) ABSTRACT

An image pickup apparatus detects a subject based on an image signal output from an image sensing unit and acquires a size of the detected subject. The image pickup apparatus performs an automatic zooming operation such that a zoom lens is driven so as to increase or decrease the size of the subject so that the size of the subject becomes equal to a reference size of the subject. In a case where the difference between the size of the subject and the reference size has increased beyond a predetermined threshold value and the position of the zoom lens has reached a wide angle end or a telephoto end, the image pickup apparatus resets the reference size to be equal to the current size of the subject.

14 Claims, 5 Drawing Sheets

IMAGE PICKUP APPARATUS AND METHOD OF CONTROLLING THE SAME

BACKGROUND OF THE INVENTION

1. Field of the Invention

The present invention relates to an image pickup apparatus and a method of controlling the image pickup apparatus.

2. Description of the Related Art

In recent years, a digital camera, a digital video camera and similar devices have been proposed which have a function of detecting a particular subject such as a face of a human figure from an image included in an image signal output from an image sensor, and performing automatic focusing and/or automatic exposure adjustment on the detected subject. Japanese Patent Laid-Open No. 9-149311 discloses an image pickup apparatus having an automatic zoom function in which when a change occurs in distance between the image pickup apparatus and a subject, an automatic zooming operation is performed such that a detected size of an image of the subject is maintained to be substantially equal to a predetermined reference value. This image pickup apparatus starts the automatic zooming operation in response to pressing of a zoom button. The size of an image of a subject detected at the start of the automatic zooming operation is stored as a reference size. During the automatic zooming operation, the image pickup apparatus repeatedly compares the detected size of the image of the subject with the reference size and performs the automatic zooming operation based on a comparison result. That is, after the automatic zooming operation starts, the image pickup apparatus continuously changes the zoom position in a direction to a telephoto end or a wide angle end so that the size of the image of the subject is maintained substantially constant.

In many image pickup apparatuses such as digital cameras and digital video cameras, optical zooming is allowed within a range of several to several tens in zooming ratio. Some image pickup apparatuses have an electronic zoom function to electronically enlarge an image of a subject. However, the electrical enlargement results in degradation in image quality, which determines a practical upper limit on the zoom ratio. The limitation on the zoom ratio of the image pickup apparatus can bring about some problems as described below.

In the image pickup apparatus having the automatic zoom function that is executed by repeatedly comparing the detected size of the image of the subject with the reference size that is set to be equal to the size as of the start of the automatic zooming operation, following problems can occur. When a zoom ratio necessary to achieve the size of the image of the subject to be equal to the reference size is out of a zoom range allowable in the image pickup apparatus, it is impossible to maintain the size of the image of the subject at the reference size. After shooting is further continued in this state, if a change occurs in distance between the image pickup apparatus and the subject, then such a change can cause the automatic zooming operation to become unnatural.

For example, in a case where when the automatic zooming operation is started, the distance between the image pickup apparatus and a subject is small and thus a close-up image of the subject is taken at the start, if the subject moves away from the image pickup apparatus after the automatic zooming operation is started, the image pickup apparatus tries to maintain the size of the image of the subject at a constant value by shifting the position of the zoom lens in a direction toward the telephoto end. However, if the zoom lens reaches the telephoto end, it becomes impossible to further maintain the size at the constant value. As a result, the size of the image of the subject decreases. If a user continues the shooting in this situation in which the size of the image of the subject has become small, the user gets used to the reduced size of the image of the subject. Thereafter, if the subject moves back toward the image pickup apparatus or the user changes the direction of the image pickup apparatus to aim another subject, the image pickup apparatus tries to control the zooming operation to get a close-up image of the subject. As a result, the size of the image of the subject suddenly increases, i.e., an unnatural automatic zooming operation occurs. A similar problem can occur when the position of the zoom lens reaches a wide angle end.

In a case where the image pickup apparatus used is a still camera, and the automatic zoom function is used to achieve a best angle of view in a still image, an unnatural zooming operation such as that described above in terms of the automatic zooming operation may be allowable to a certain degree. However, in a case where a user takes a movie using a video camera or the like, a sequence of images is recorded as the movie in the automatic zoom mode. In this case, it is desirable that the automatic zooming operation is performed such that the size of the subject changes in a natural manner without giving an artificial feeling to a user. That is, such a natural automatic zooming operation is more important in taking a movie by an image pickup apparatus such as a video camera than in taking a still image. In recent years, many digital still cameras have tended to have a movie recording capability, and a natural automatic zooming operation is also important in such a type of image pickup apparatus.

When zooming reaches an upper or lower end of a zooming range and thus it becomes impossible to further control the size of the image of the subject, the image pickup apparatus may display a warning to a user on a display screen such as a liquid crystal display panel. However, displaying such a warning for a long time may annoy the user. To prevent the user from having such a feeling, the image pickup apparatus may stop displaying the warning after the warning has been displayed for a predetermined period. However, this can cause the user to be unaware of the fact that the upper or lower end of the zoom range has been reached and the size of the image of the subject cannot be controlled any more.

SUMMARY OF THE INVENTION

In view of the above, the present invention provides an image pickup apparatus and a method of controlling an image pickup apparatus that are capable of performing an automatic zooming operation without having an unnatural operation at either end of a zooming range.

According to an aspect of the present invention, there is provided an image pickup apparatus including an image sensing unit configured to sense an image of a subject formed by an optical imaging system including a zoom lens and output a resultant image signal, a subject detection unit configured to detect the subject in an image screen based on the image signal output from the image sensing unit, a subject size acquisition unit configured to acquire a size of the subject detected by the subject detection unit, and a controller configured to perform an automatic zooming operation such that the zoom lens is driven to increase or decrease the size of the subject acquired by the subject size acquisition unit so that the size of the subject becomes equal to a set reference size, wherein in a case where a position of the zoom lens has reached a wide angle end or a telephoto end, the controller resets the reference size to be equal to the size of the subject.

Further features of the present invention will become apparent from the following description of exemplary embodiments with reference to the attached drawings.

DESCRIPTION OF THE EMBODIMENTS

Figure 1:
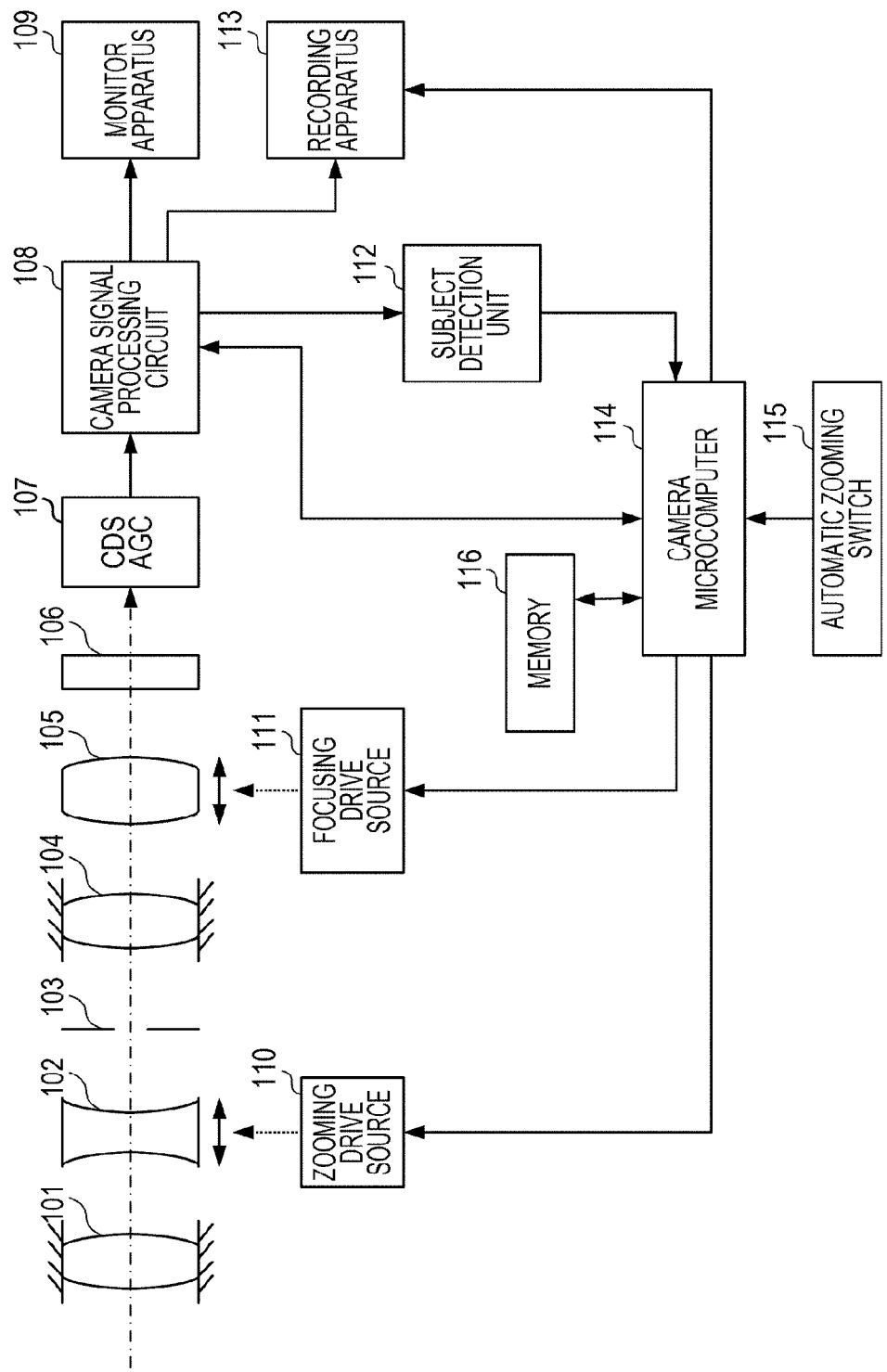
FIG. 1 is a diagram illustrating an example of a configuration of an image pickup apparatus according to an embodiment of the present invention.

FIG. 1 is a diagram illustrating an example of a configuration of an image pickup apparatus according to a first embodiment of the present invention. In this embodiment, it is assumed that the image pickup apparatus is a video camera. Note that the present invention can also be applied to other image pickup apparatuses such as a digital still camera. In FIG. 1, the image pickup apparatus includes a first fixed lens 101, a zoom lens 102, an aperture 103, a second fixed lens 104, and a focus compensator lens (hereinafter referred to as a focus lens) 105, which are disposed at successive locations along an optical axis so as to form an optical imaging system. The zoom lens 102 is movable along the optical axis in the zooming operation. The focus lens 105 has two functions, i.e., a function of correcting the movement of a focal plane in response to the zooming operation, and a focusing function. An image sensor 106 is realized by a photoelectric conversion element such as a CCD sensor, a CMOS sensor, or the like. Note that CCD is an abbreviation for charge coupled device, and CMOS is an abbreviation for complementary metal oxide semiconductor.

The image sensor 106 senses an optical image formed via the optical imaging system, i.e., the image sensor 106 converts the optical image into an electric signal (image signal) and outputs the resultant electric signal to the CDS/AGC circuit 107. That is, the image sensor 106 functions as an image sensing unit configured to sense an image of a subject formed via the optical imaging system including the zoom lens and output an image signal. Note that CDS is an abbreviation for correlated double sampling and AGC is an abbreviation for automatic gain control. The CDS/AGC circuit 107 samples the image signal output from the image sensor 106 and adjusts the gain for the image signal. A camera signal processing circuit 108 produces an image signal by performing various kinds of image processing on the signal output from the CDS/AGC circuit 107. A monitor apparatus 109 displays the image signal supplied from the camera signal processing circuit 108. The image signal displayed may be used by a user to monitor the image. The monitor apparatus 109 also displays various kinds of information such as a camera status, a warning, etc. The monitor apparatus 109 may be realized by an LCD (Liquid Crystal Display) or the like.

A zooming drive source 110 and a focusing drive source 111 each include actuators such as a stepping motor, a DC motor, a vibration motor, a voice coil motor, etc. The zooming drive source 110 drives the zoom lens 102 to move it under the control of the camera microcomputer 114. The focusing drive source 111 drives the focus lens 105 to move it under the control of the camera microcomputer 114. More specifically, the zooming drive source 110 and the focusing drive source 111 are both controlled by the camera microcomputer 114 in accordance with calculated driving amounts, driving directions, and driving speeds.

A subject detection unit 112 performs a subject detection process including detecting a subject area in an image screen from the image signal output from the CDS/AGC circuit 107 and determining feature values of the subject such as a location, a size, an area, etc. of the image of the subject. Hereinafter, the determined feature values will be generically referred to as a subject size. The information on the subject size is sent from the subject detection unit 112 to the camera microcomputer 114. That is, the subject detection unit 112 serves as a subject detection unit that detects a subject in an image screen based on an image signal output from an image sensing unit. In particular, the subject detection process may be performed to detect a face area of a human figure in the image screen. The subject detection unit 112 may perform the subject detection process using, for example, one of methods (1) and (2) described below. In the method (1), a skin color area is extracted based on half tone colors of respective pixels represented by the image data, and a face is detected based on a degree of matching with face edge templates that are prepared in advance. In the second method (2), a face is detected by extracting feature points of eyes, a nose, and a mouth using a known pattern recognition technique.

Note that the subject detection unit 112 may perform the subject detection process using other methods instead of the method (1) or (2) described above. The subject detected by the subject detection unit 112 is not limited to a face of a human figure. The image pickup apparatus may include a subject designation unit (not shown) used by a user to designate a subject. The subject detection unit 112 may detect a subject area using, for example, a known pattern matching technique or the like based on luminance information or color information of an image signal of the subject designated by the subject designation unit. A recording apparatus 113 records the signal output from the camera signal processing circuit 108 in a recording medium such as a magnetic tape, an optical disk, a magnetic disk, a semiconductor memory, etc.

The camera microcomputer 114 controls the operation of the whole image pickup apparatus. The camera microcomputer 114 functions as a subject size acquisition unit that acquires a size of the subject detected by the subject detection unit 112. The camera microcomputer 114 also functions as reference size setting unit that sets a reference size S0 of the subject. The reference size S0 of the subject is employed as a reference in the automatic zooming operation. The camera microcomputer 114 also functions as a controller that controls the automatic zooming operation such that the zoom lens 102 is driven so that the size of the subject detected by the subject detection unit 112 is equal to the reference size S0 set in the above described manner. The camera microcomputer 114 determines whether the difference between the detected size of the subject and the set reference size S0 is greater than a predetermined threshold value. If the difference is greater than the threshold value, the camera microcomputer 114 further determines whether the position of the zoom lens 102 has reached a wide angle end or a telephoto end. If so, the camera microcomputer 114 resets the reference size S0 to be equal to the current size of the subject.

An auto zoom switch 115 is operated by a user to issue control information to start or end the automatic zooming operation. If the user turns on the auto zoom switch 115, the auto zoom switch 115 issues control information instructing that the automatic zooming operation is to be started. On the other hand, if the user turns off the auto zoom switch 115, the auto zoom switch 115 issues control information instructing that the automatic zooming operation is to be ended. The camera microcomputer 114 starts or ends the automatic zooming operation in accordance with the control information issued by the auto zoom switch 115. A memory 116 stores a program and data used by the camera microcomputer 114 in performing various processes. More specifically, a computer program is stored therein to realize the method of controlling the image pickup apparatus according to the present embodiment of the invention. The memory 116 is also used to store the reference size of the subject. The memory 116 includes a DRAM, a flash ROM, or the like. Note that DRAM is an abbreviation for dynamic random access memory, and ROM is an abbreviation for read only memory.

In the image pickup apparatus according to the present embodiment, the automatic zooming function is realized using an optical method in which the zoom lens 102 is driven to achieve zooming. Alternatively, the automatic zooming function may be realized by an electronic method, i.e., the image of the subject may be enlarged electronically. The image pickup apparatus may perform the automatic zooming operation by a combination of the optical zooming method and the electronic zooming method.

Figure 2:
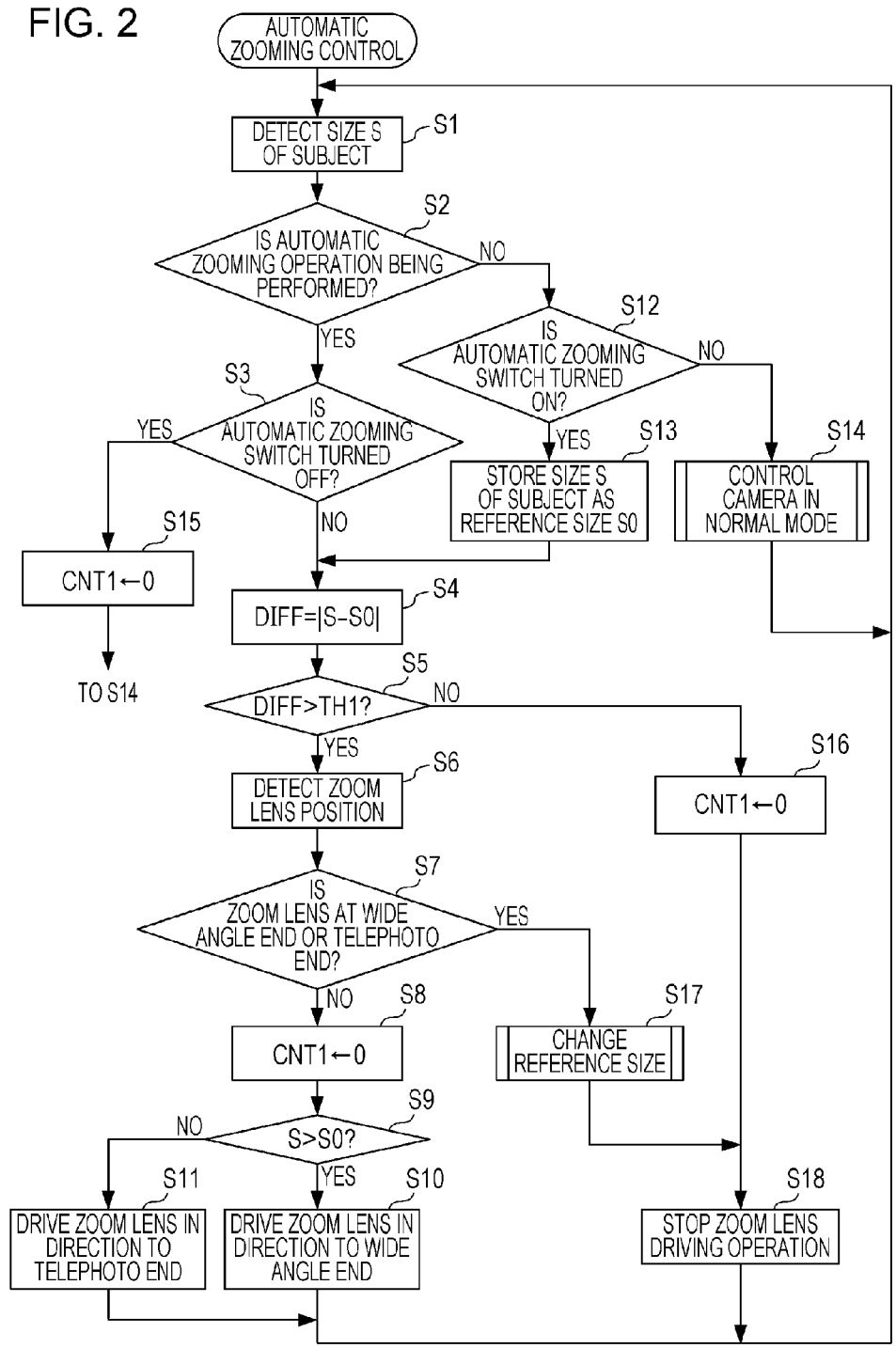
FIG. 2 is a flow chart illustrating an automatic zoom control process.

FIG. 2 illustrates an example of a flow of the automatic zooming operation performed by the image pickup apparatus according to the present embodiment of the invention. First, the camera microcomputer 114 acquires a size S of a subject from the subject detection unit 112 (step S1). Next, the camera microcomputer 114 determines whether the automatic zooming operation is being performed (step S2). In a case where the camera microcomputer 114 determines that the automatic zooming operation is not being performed, the processing flow proceeds to step S12. In this case, the camera microcomputer 114 further determines whether the auto zoom switch 115 is turned on (step S12). In a case where it is determined that the auto zoom switch 115 is not turned on, the camera microcomputer 114 performs a normal camera control process (step S14), and thereafter the processing flow returns to step S1. In a case where the auto zoom switch 115 is turned on, the camera microcomputer 114 stores the current size S of the subject as the reference size S0 of the subject in the memory 116 (step S13). Thereafter the processing flow proceeds to step S4.

On the other hand, in a case where the camera microcomputer 114 determines in step S2 that the automatic zooming operation is being performed, the camera microcomputer 114 further determines whether the auto zoom switch 115 is turned off (step S3). If it is determined that the auto zoom switch 115 is turned off, the camera microcomputer 114 resets a count value CNT1 to 0 (step S15). Thereafter the processing flow proceeds to step S14. In step S14, the camera microcomputer 114 performs a normal camera control operation. The count value CNT1 is a variable indicating a time spent in a state in which the size of the subject has not been maintained at the reference size S0 since the position of the zoom lens 102 reached either the telephoto end or the wide angle end.

In a case where the auto zoom switch 115 is not turned off, the absolute value of the difference between the current size S of the subject and the reference size S0 is stored in a variable DIFF (step S4). Thereafter, the camera microcomputer 114 determines whether DIFF is greater than a predetermined threshold value TH1 (step S5), Note that the threshold value TH1 is set by the camera microcomputer 114 so that the threshold value TH1 prevents the zooming operation from having an unstable vibration due to a small change in size S of the subject caused by, for example, a detection error of the subject detection unit 112. The threshold value TH1 may be fixed or may be variably determined to be equal to a particular fraction (for example, 10%) of the subject size S. Alternatively, the camera microcomputer 114 may variably set the threshold value TH1 depending on the zoom ratio or the like.

In a case whether DIFF is not greater than the threshold value TH1, the camera microcomputer 114 resets the count value CNT1 to 0 (step S16). The camera microcomputer 114 then stops driving the zoom lens (step S18). Thereafter, the processing flow returns to step S1. On the other hand, in a case where DIFF is greater than the threshold value TH1, the camera microcomputer 114 acquires the current position of the zoom lens 102 (step S6). More specifically, the camera microcomputer 114 acquires the current position of the zoom lens 102, for example, from a result of detection of the position of the zoom lens 102 performed by a position sensor (not shown) disposed in the image pickup apparatus. In a case where a stepping motor is used as the zooming drive source 110, the camera microcomputer 114 determines the position of the zoom lens 102 based on the count value of driving pulses of the motor.

Next, the camera microcomputer 114 determines whether the acquired position of the zoom lens 102 is at either one of the ends of the zoom range, i.e., at either the wide angle end or the telephoto end (step S7). In a case where the position of the zoom lens 102 at either one of the ends of the zoom range, the camera microcomputer 114 changes the reference size (step S17), and then the processing flow proceeds to step S18. In a case where the position of the zoom lens 102 is not at either one of the ends of the zoom range, the camera microcomputer 114 resets the count value CNT1 to 0 (step S8). Thereafter, the camera microcomputer 114 determines whether the current size S of the subject is greater than the reference size S0 (step S9). In a case where the size S of the subject is greater than the reference size S0, the camera microcomputer 114 drives the zoom lens 102 in a direction to the wide angle end (step S10), and thereafter the processing flow returns to step S1. The driving the zoom lens 102 in the direction to the wide angle end causes the size of the image of the subject to decrease so that the size S of the subject approaches the reference size S0.

In a case where the size S of the subject is smaller than the reference size S0, the camera microcomputer 114 drives the zoom lens 102 in a direction toward the telephoto end (step S11), and thereafter the processing flow returns to step S1. The driving the zoom lens 102 in the direction toward the telephoto end causes the size of the image of the subject to increase so that the size S of the subject approaches the reference size S0.

Figure 3:
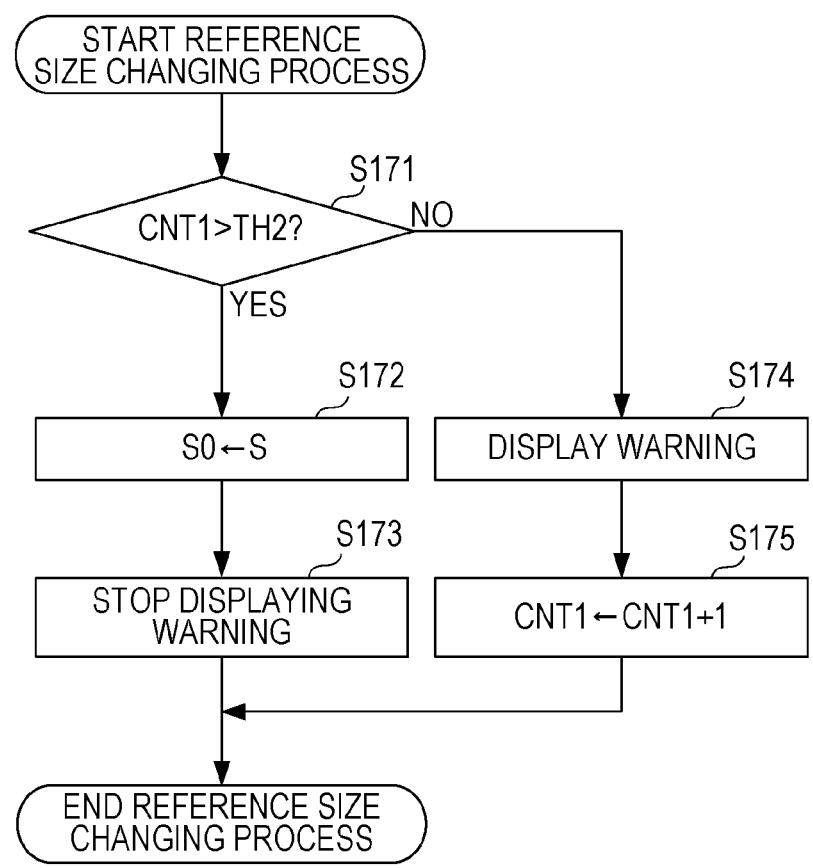
FIG. 3 is a flow chart illustrating a process of changing a reference size.

FIG. 3 is a flow chart illustrating details of the process of changing the reference size performed in step S17 shown in FIG. 2. First, the camera microcomputer 114 determines whether the count value CNT1 is greater than a threshold value TH2 (step S171). The threshold value TH2 may be fixed at, for example, 10 seconds or 1 minute, or may be arbitrarily set by a user. Alternatively, the image pickup apparatus may have a program to learn a tendency or a preference of a user and may determine the threshold value TH2 depending on the tendency or the preference learned by the program.

In a case where the count value CNT1 is smaller than the threshold value TH2, the camera microcomputer 114 displays a warning to a user on the monitor apparatus 109 (step S174) thereby notifying the user that the position of the zoom lens 102 has reached one of the ends of the zoom range and thus the size of the subject cannot be maintained at the reference size S0. Thus the monitor apparatus 109 functions as a display that displays a warning when the difference between the size of the subject and the reference size is greater than the predetermined threshold value (i.e., the answer to step S4 in FIG. 2 is YES) and the position of the zoom lens 102 has reached the wide angle end or the telephoto end (i.e., the answer to step S7 is YES). Thereafter, the camera microcomputer 114 increments the count value CNT1 (step S175), and then the process is ended.

On the other hand, in a case where the count value CNT1 is greater than the threshold value TH2, i.e., the position of the zoom lens has remained at one of the ends of the zoom range for a time equal to or longer than the threshold value TH2, the processing flow proceeds to step S172. In step S172, the camera microcomputer 114 stores the current size S of the subject as the reference size S0 in the memory 116 (step S172) thereby resetting the reference size S0 to be equal to the size S of the subject. Thereafter, the camera microcomputer 114 stops displaying the warning to the user on the monitor apparatus 109 (step S173), and then the process is ended. That is, the monitor apparatus 109 stops displaying the warning when the camera microcomputer 114 resets the reference size S0 to a new value.

Figure 4A:
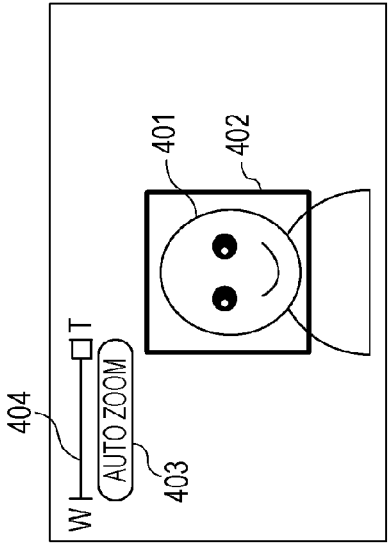
FIGS. 4A to 4D are diagrams illustrating examples of states of a monitor apparatus.

FIGS. 4A to 4D are diagrams illustrating examples of states of the monitor apparatus. FIG. 4A illustrates an example of a state of the monitor apparatus 109 when the image pickup apparatus is performing the automatic zooming operation. In this example, it is assumed that a face of a human figure is the subject 401 for which the automatic zooming operation is being performed. If the size S of the subject is acquired in step S1 in FIG. 2 as described above, then the monitor apparatus 109 displays a subject frame 402 at the location of the subject 401 on the screen such that the subject frame 402 is superimposed on the image of the subject 401 as shown in FIG. 4A thereby notifying a user of a part and a size of an image currently designated as a current target of the automatic zoom operation. If the user presses the auto zoom switch 115, the camera microcomputer 114 stores as the reference size S0 the size of the subject 401 as of when the auto zoom switch 115 is pressed (step S13 in FIG. 2), and the camera microcomputer 114 starts the automatic zooming operation.

During the automatic zooming operation, the monitor apparatus 109 displays an automatic zoom on/off indicator 403 to notify the user that the automatic zooming operation is being performed. The monitor apparatus 109 also displays a zoom indicator 404. The zoom indicator 404 indicates the position of the zoom lens 102 and a moving direction thereof (to the telephoto end (T) or the wide angle end (W)). In the example shown in FIG. 4A, a triangular mark on the zoom indicator 404 indicates the position of the zoom lens 102, and the direction of the triangular mark indicates a direction in which the zoom lens 102 moves. In this specific example, as the subject is moving away (and thus the size of the subject is decreasing), the image pickup apparatus is driving the zoom lens 102 in the direction to the telephoto end. Thus, the triangular mark points to the telephoto end (T).

Figure 4B:
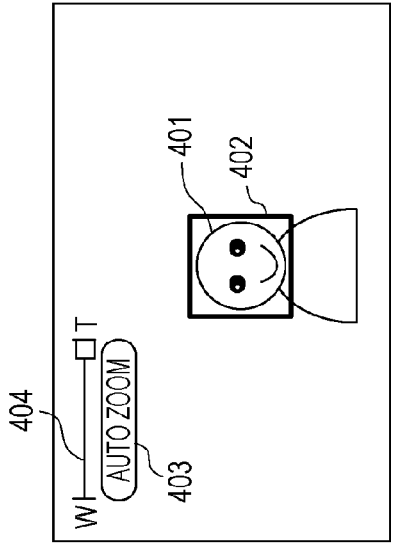
Figure 4C:
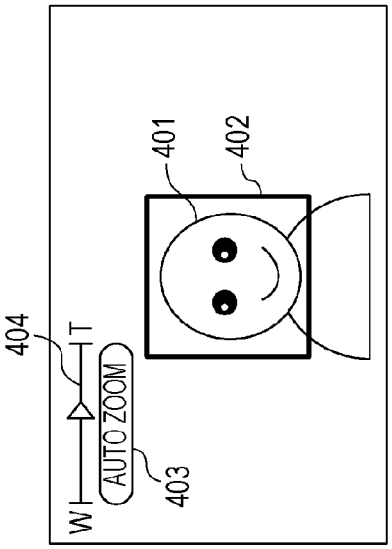

FIG. 4B illustrates an example of a state in which the subject has moved away from the state shown in FIG. 4A and the position of the zoom lens 102 has reached the telephoto end. A square mark on the zoom indicator 404 indicates that the zoom lens 102 is at rest. As can be seen, in this example, the square mark is located at an end of the indicator 404 such that the square mark is in contact with the telephoto end (T) to indicate that the zoom lens 102 is at rest at the telephoto end. However, at this stage, the size of the subject is still maintained at the reference size (equal to the size of the subject 401 in FIG. 4A) and thus no warning is displayed. FIG. 4C illustrates a state in which the subject has moved further away from the state shown in FIG. 4B, and the size of the image of the subject 401 can no longer be maintained at the reference size. In this state, the monitor apparatus 109 issues a warning to the user by blinking the subject frame 402. The manner of issuing the warning is not limited to blinking the subject frame. For example, the monitor apparatus 109 may change the shape or color of the subject frame or may display a character or an icon to indicate a warning. Alternatively, the monitor apparatus 109 may output a voice to give a warning to a user.

Figure 4D:
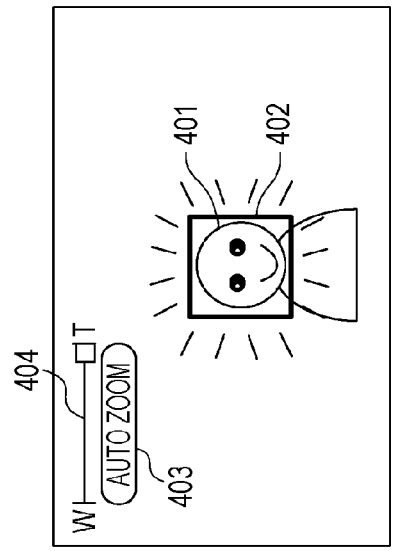

FIG. 4D illustrates a state in which after the state shown in FIG. 4C has continued for a time equal to or longer than a predetermined value, the reference size of the automatic zooming operation has been reset to a new value (step S172 in FIG. 3). After the reference size has been changed, the camera microcomputer 114 stops displaying the warning (step S173 in FIG. 3), and thus the subject frame 402 displayed on the monitor apparatus 109 does not blink as shown in FIG. 4D. In the example shown in FIG. 4D, the monitor apparatus 109 does not notify a user that the reference size has been changed. Alternatively, the monitor apparatus 109 may change the shape, the color, or the displaying manner of the subject frame to notify the user that the reference size has been changed. Alternatively, the monitor apparatus 109 may display a character or an icon to notify that the reference size has been changed.

In the first embodiment described above, the image pickup apparatus resets the reference size to be equal to the current subject size when the difference between the subject size and the reference size has increased beyond the predetermined threshold value and the state in which the position of the zoom lens 102 is at the wide angle end or the telephoto end has continued for a time equal to or longer than the predetermined threshold value. This makes it possible for the image pickup apparatus to perform the automatic zooming operation so as to maintain the subject size when the subject moves toward the image pickup apparatus after the reference size has been changed whereby it becomes possible to suppress an unnatural operation in a state in which the image pickup apparatus reaches one of ends of the zoom range. That is, it is possible to achieve a natural automatic zooming operation. The image pickup apparatus stops displaying a warning after the reference size is reset to a new value thereby preventing the warning from being displayed unnecessarily for a long time, which may annoy a user.

Next, an image pickup apparatus according to a second embodiment of the present invention is described below. The image pickup apparatus according to the second embodiment is similar in configuration to that according to the first embodiment described above with reference to FIG. 1. In the second embodiment, the image pickup apparatus performs an automatic zooming operation in a similar manner to the first embodiment described above with reference to FIG. 2 except for the manner of resetting the reference size to a new value. Note that in the second embodiment, as described below, the count value CNT1 is used in a different manner from that in the first embodiment.

Figure 5:
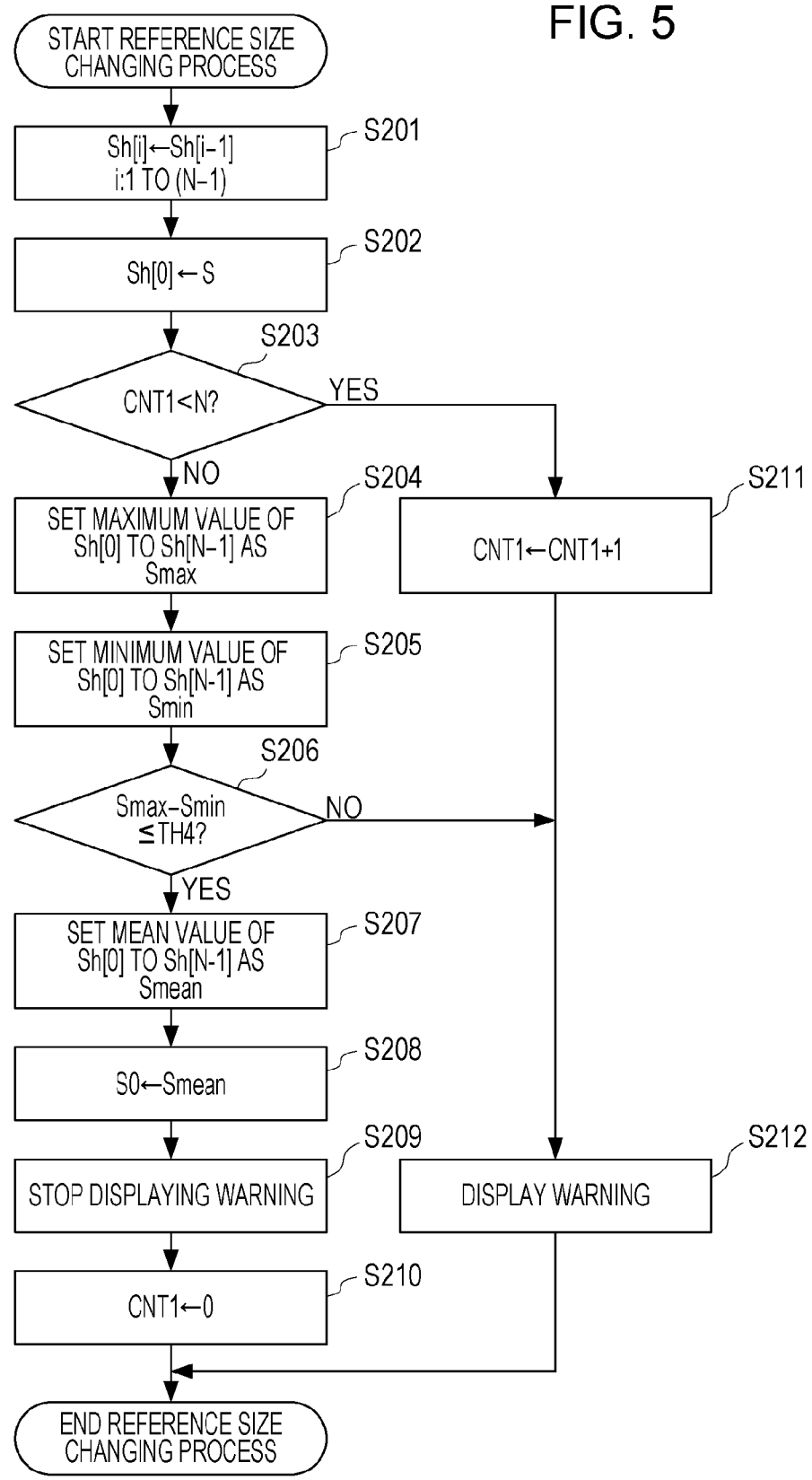
FIG. 5 is a flow chart illustrating a process of changing a reference size.

FIG. 5 is a flow chart illustrating a process of changing the reference size performed by the image pickup apparatus according to the second embodiment of the preset invention. First, the camera microcomputer 114 restores data stored in an array Sh[i] (i=0 to (N−1)) such that data in each array element is transferred to an adjacent array element (step S201). In each element of the array Sh[i], data indicating the size S of a subject in the past is stored. That is, subject size history information is stored in the array Sh[i]. The number, N, of elements of the array Sh[i] indicates a threshold value of the number of pieces of history data according to which to determine whether the reference size is to be reset to a new value. When N is reduced, the reference size is changed more frequently, while if N is increased, the reference size is changed less frequently. N may be fixed, for example, at a value corresponding to 10 seconds, 1 minute, or the like or N may be set by a user as required. Alternatively, the image pickup apparatus may have a program to learn a tendency or a preference of a user and may determine N depending on the tendency or the preference learned by the program.

Next, the camera microcomputer 114 stores the size S of the subject in Sh[0] (step S202). Note that previous data in Sh[0] has been transferred to Sh[0] in step S201 described above. Therefore, it is allowed to store in step S202 the size S of the subject in Sh[0]. The camera microcomputer 114 determines whether a count value CNT1 is smaller than N (step S203). In the second embodiment, the count value CNT1 indicates the number of times subject size history data has been stored in the array Sh[i] in a state in which the subject size cannot be maintained at the reference size. When the automatic zooming operation is not being performed or when the subject size is successfully maintained at the reference size, or when the position of the zoom lens has not yet reached either one of ends of the zoom range, the count value CNT1 is reset to 0 in step S15, step S16, or step S8 in FIG. 8.

In a case where the count value CNT1 is smaller than N, the camera microcomputer 114 increments the count value CNT1 (step S211). The monitor apparatus 109 then displays a warning to a user (step S212), and then the process is ended. On the other hand, in a case where the count value CNT1 is greater than N, there are a sufficiently large number of pieces of history data to determine whether the reference size is to be changed. Therefore, in this case, the camera microcomputer 114 extracts a maximum value of sizes of the subject from N pieces of past data stored in Sh[i] and stores the extracted maximum value in a variable Smax (step S204). Subsequently, the camera microcomputer 114 extracts a minimum value of sizes of the subject from N pieces of past data stored in Sh[i] and stores the extracted minimum value in a variable Smin (step S205).

Next, the camera microcomputer 114 determines whether the difference between Smax and Smin is equal to or smaller than a threshold value TH4 (step S206). The difference between Smax and Smin corresponds to a maximum change in subject size during a period corresponding to the N pieces of history data in the state in which the subject size has not been maintained at the reference size. When the difference between Smax and Smin is equal to or smaller than threshold value TH4, it can be concluded that a maximum change in subject size is small during a period in which the subject size has not been maintained at the reference size, and thus the change in subject size is stable. The threshold value TH4 is calculated and set based on the threshold value TH1 used in step S5 in FIG. 2. The threshold value TH4 may be fixed or may be determined to be equal to a particular fraction of the subject size. Alternatively, the threshold value TH4 may be determined variably depending on the zoom ratio.

In a case where it is determined that the difference between Smax and Smin is greater than TH4, a large change has occurred in subject size, which means that the subject size is not stable. In this case, the processing flow proceeds to step S212 in which the monitor apparatus 109 displays a warning to a user. On the other hand, in a case where it is determined that the difference between Smax and Smin is smaller than TH4, the camera microcomputer 114 determines that the subject size is stable, and the camera microcomputer 114 resets the reference size to a new value as follows. That is, the camera microcomputer 114 determines the mean value of the N pieces of past data stored in Sh[i] and stores the result in a variable Smean (step S207). The camera microcomputer 114 then stores the value of the variable Smean in the memory 116 as a new reference size S0 (step S208). Next, the camera microcomputer 114 stops displaying the warning to the user on the monitor apparatus 109 (step S209). Thereafter, the camera microcomputer 114 resets the count value CNT1 to 0 (step S210), and then the process is ended.

In the second embodiment, as described above, if the difference between the detected subject size and the reference size has increased beyond the predetermined threshold value and if the position of the zoom lens 102 has reached the wide angle end or the telephoto end, then the image pickup apparatus performs the following process. That is, based on the acquired subject size history information, the image pickup apparatus determines whether the change in subject size is within the predetermined threshold value. If the change in subject size is within the predetermined threshold value, the reference size is reset to be equal to the mean value of the subject size. This makes it possible to suppress an unnatural operation in a state in which the image pickup apparatus reaches one of ends of the zoom range. That is, it is possible to achieve a natural automatic zooming operation. In this image pickup apparatus, because the reference size is reset to a new value in a state in which the subject size is stable, it is possible to prevent the subject size from being changed to a size unintended by a user in a state in which the subject size is unstable. This makes it possible to achieve a still more natural automatic zooming operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-087509 filed Apr. 6, 2010, which is hereby incorporated by reference herein in its entirety.

The image pickup apparatus according to any of the embodiments of the invention may find applications including picking up an image of a subject.

What is claimed is:

1. An image pickup apparatus comprising:
   an image sensing unit configured to sense an image of a subject formed by an optical imaging system including a zoom lens and output an image signal;
   a subject detection unit configured to detect the subject in an image screen based on the image signal output from the image sensing unit;
   a subject size acquisition unit configured to acquire a size of the subject detected by the subject detection unit; and
   a controller configured to perform an automatic zooming operation such that the zoom lens is driven to increase or decrease the size of the subject acquired by the subject size acquisition unit so that the size of the subject becomes equal to a reference size,
   wherein in a first case the controller resets the reference size to be equal to the size of the subject, and in a second case the controller resets the reference size to be equal to a mean value of subject sizes,
   wherein the first case is a case where the difference between the acquired size of the subject and the set reference size has increased beyond a predetermined threshold value and the position of the zoom lens has reached the wide angle end or the telephoto end, and wherein the second case is a case where the change in subject size is within the predetermined threshold value.

2. The image pickup apparatus according to claim 1, wherein in a case where the difference between the acquired size of the subject and the set reference size has increased beyond a predetermined threshold value, the controller resets the reference size to be equal to the size of the subject.

3. The image pickup apparatus according to claim 1, wherein in a case where the difference between the acquired size of the subject and the set reference size has increased beyond a predetermined threshold value and the position of the zoom lens has remained at the wide angle end or the telephoto end for a continuous time longer than a predetermined threshold value, the controller resets the reference size to be equal to the current size of the subject.

4. An image pickup apparatus comprising:
an image sensing unit configured to sense an image of a subject formed by an optical imaging system including a zoom lens and output an image signal;
a subject detection unit configured to detect the subject in an image screen based on the image signal output from the image sensing unit;
a subject size acquisition unit configured to acquire a size of the subject detected by the subject detection unit;
a controller configured to perform an automatic zooming operation such that the zoom lens is driven to increase or decrease the size of the subject acquired by the subject size acquisition unit so that the size of the subject becomes equal to a set reference size; and
an informing unit configured to inform information when the position of the zoom lens has reached a wide angle end or a telephoto end,
wherein in a case where a position of the zoom lens has reached the wide angle end or the telephoto end, the controller resets the reference size to be equal to the size of the subject, and
wherein in a case where the controller has reset the reference size to a new value, the informing unit stops informing information.

5. The image pickup apparatus according to claim 4, wherein in a case where the difference between the acquired size of the subject and the set reference size has increased beyond a predetermined threshold value, the controller resets the reference size to be equal to the size of the subject.

6. The image pickup apparatus according to claim 4, wherein in a case where the difference between the acquired size of the subject and the set reference size has increased beyond a predetermined threshold value and the position of the zoom lens has remained at the wide angle end or the telephoto end for a continuous time longer than a predetermined threshold value, the controller resets the reference size to be equal to the current size of the subject.

7. The image pickup apparatus according to claim 4, wherein the informing unit displays a warning when the position of the zoom lens has reached a wide angle end or a telephoto end.

8. An image pickup apparatus comprising:
an image sensing unit configured to sense an image of a subject formed by an optical imaging system including a zoom lens and output an image signal;
a subject detection unit configured to detect the subject in an image screen based on the image signal output from the image sensing unit;
a subject size acquisition unit configured to acquire a size of the subject detected by the subject detection unit; and
a controller configured to perform an automatic zooming operation such that the zoom lens is driven to increase or decrease the size of the subject acquired by the subject size acquisition unit so that the size of the subject becomes equal to a reference size, wherein, in a first case, the controller resets the reference size to a first size of a subject, and in a second case, the controller resets the reference size to a second size of a subject,
wherein the first case is a case where the difference between the acquired size of the subject and the set reference size has increased beyond a predetermined threshold value and the second case is a case where the changing amount in subject size is within the predetermined threshold value, and
wherein the first size is a size after having changed and the second size is a changing size on the way.

9. The image pickup apparatus according to claim 8, wherein in a case where the difference between the acquired size of the subject and the set reference size has increased beyond a predetermined threshold value, the controller resets the reference size to be equal to the size of the subject.

10. The image pickup apparatus according to claim 8, wherein in a case where the difference between the acquired size of the subject and the set reference size has increased beyond a predetermined threshold value and the position of the zoom lens has remained at the wide angle end or the telephoto end for a continuous time longer than a predetermined threshold value, the controller resets the reference size to be equal to the current size of the subject.

11. An image pickup apparatus comprising:
an image sensing unit configured to sense an image of a subject formed by an optical imaging system including a zoom lens and output an image signal;
a subject detection unit configured to detect the subject in an image screen based on the image signal output from the image sensing unit;
a subject size acquisition unit configured to acquire a size of the subject detected by the subject detection unit;
a controller configured to perform an automatic zooming operation such that the zoom lens is driven to increase or decrease the size of the subject acquired by the subject size acquisition unit so that the size of the subject becomes equal to a reference size; and
an informing unit configured to inform an information when the position of the zoom lens has reached a wide angle end or a telephoto end,
wherein in a case where a position of the zoom lens has increased beyond a predetermined threshold value, the controller resets the reference size to be equal to the size of the subject, and
wherein in a case where the controller has reset the reference size to a new value, the informing unit stops informing information.

12. The image pickup apparatus according to claim 11, wherein, in a case where the difference between the acquired size of the subject and the set reference size has increased beyond a predetermined threshold value, the controller resets the reference size to be equal to the size of the subject.

13. The image pickup apparatus according to claim 11, wherein, in a case where the difference between the acquired size of the subject and the set reference size has increased beyond a predetermined threshold value and the position of the zoom lens has remained at the wide angle end or the telephoto end for a continuous time longer than a predetermined threshold value, the controller resets the reference size to be equal to the current size of the subject.

14. The image pickup apparatus according to claim 11, wherein the informing unit displays a warning when the position of the zoom lens has reached a wide angle end or a telephoto end.

* * * * *